United States Patent
Estkowski

(10) Patent No.: US 6,783,566 B2
(45) Date of Patent: Aug. 31, 2004

(54) COMBINATION FILTER/CARTRIDGE ASSEMBLY

(75) Inventor: Christopher G. Estkowski, Pullman, MI (US)

(73) Assignee: Scott Technologies, Inc., Beachwood, OH (US)

( * ) Notice: Subject to any disclaimer, the term of this patent is extended or adjusted under 35 U.S.C. 154(b) by 0 days.

(21) Appl. No.: 10/066,199

(22) Filed: Oct. 26, 2001

(65) Prior Publication Data

US 2002/0069762 A1 Jun. 13, 2002

Related U.S. Application Data

(60) Provisional application No. 60/243,918, filed on Oct. 27, 2000.

(51) Int. Cl.[7] .................................................. A62B 7/00
(52) U.S. Cl. .................... 55/418; 55/513; 55/DIG. 33; 55/DIG. 35; 128/201.25; 128/206.12; 128/206.16; 239/57
(58) Field of Search ......................... 55/418, 501, 513, 55/519, DIG. 33, DIG. 35; D24/110.1; 128/201.25, 205.27, 205.29, 206.12, 206.16, 206.17; 239/55, 56, 57

(56) References Cited

U.S. PATENT DOCUMENTS

| | | | |
|---|---|---|---|
| 3,142,549 A | | 7/1964 | Klusewitz et al. |
| 4,064,876 A | | 12/1977 | Mulchi |
| 4,179,274 A | * | 12/1979 | Moon ........................... 55/524 |
| 4,548,626 A | * | 10/1985 | Ackley et al. ................. 96/139 |
| 4,714,486 A | * | 12/1987 | Silverthorn ................... 96/134 |
| 4,867,770 A | | 9/1989 | Feeney |
| 5,240,479 A | | 8/1993 | Bachinski |
| 5,732,695 A | * | 3/1998 | Metzger ................. 128/206.12 |
| 5,766,286 A | | 6/1998 | Flaherty et al. |
| 6,016,804 A | * | 1/2000 | Gleason et al. ......... 128/206.17 |
| 6,044,842 A | * | 4/2000 | Pereira et al. ......... 128/202.27 |
| 6,055,983 A | | 5/2000 | Metzger |

\* cited by examiner

*Primary Examiner*—Frank M. Lawrence
(74) *Attorney, Agent, or Firm*—Hodgson Russ LLP

(57) ABSTRACT

A filter cartridge assembly including a replendam that combines a particulate filter with an irregular shaped gas sorbent bed. Best operational practice requires that the air passing through the filter be distributed uniformly over the sorbent bed. The replendam directs the air over the surface of the larger sorbent bed utilizing vane-like structures extending from the reticulated member providing for uniform distribution.

12 Claims, 10 Drawing Sheets

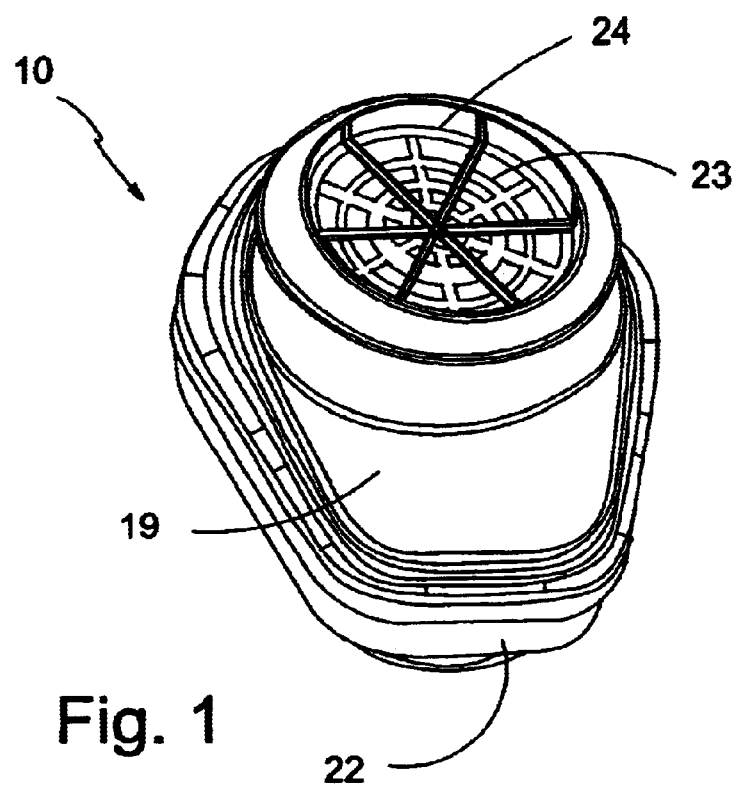
Fig. 1
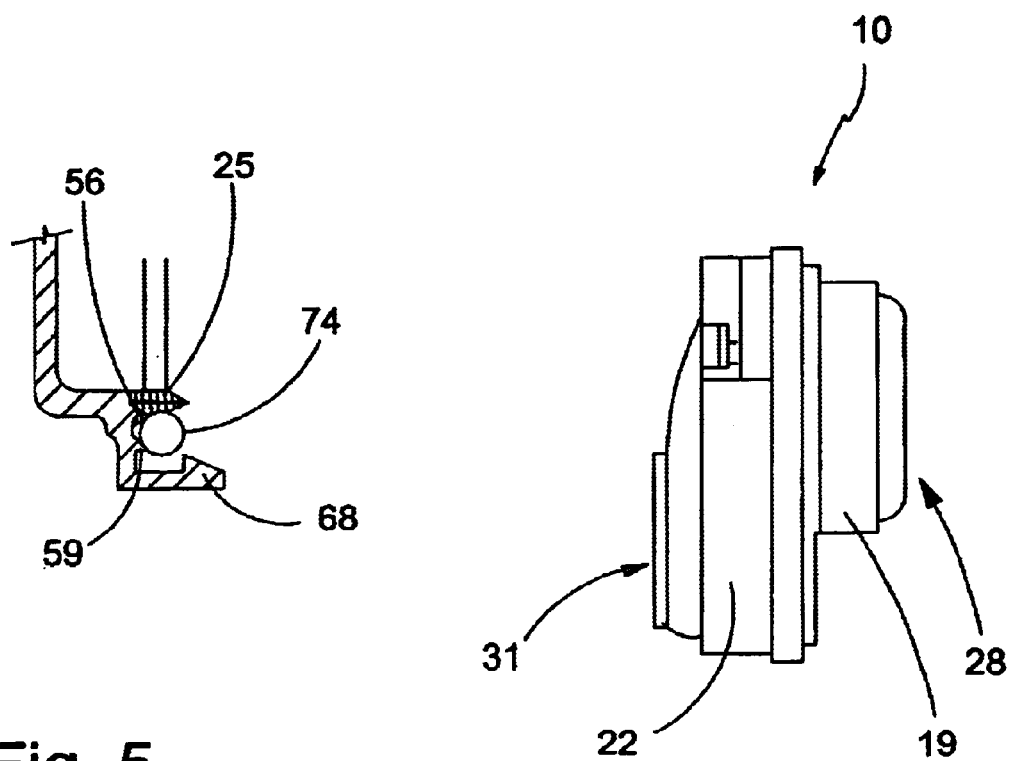
Fig. 5
Fig. 2

US 6,783,566 B2

COMBINATION FILTER/CARTRIDGE ASSEMBLY

CROSS-REFERENCE TO RELATED APPLICATION

Applicant hereby claims priority based on U.S. Provisional Application No. 60/243,918 filed Oct. 27, 2000, entitled "Combination Filter/Cartridge Assembly," which is incorporated herein by reference.

FIELD OF THE INVENTION

The present invention relates to air-purifying filter cartridge assemblies and in particular to a combination filter/cartridge assembly containing a particulate filter media in series arrangement with a sorbent bed.

BACKGROUND OF THE INVENTION

Cartridge filtering assemblies have been described previously in the art. One such assembly U.S. Pat. No. 4,548,626 to Ackley, discloses a combination of a radially pleated filter and a sorbent bed. This invention does not disclose a support between the round filter and the sorbent bed having radially directed vanes for distributing air over the sorbent bed. Thus, the airflow through the sorbent bed may be short circuited and cause premature exhaustion of the bed.

U.S. Pat. No. 6,044,842 to Pereira et al., discloses a gasketless adapter for fastening two filter elements to one another. However, the geometrical structure of the arrangement of the first and second does not allow for full utilization of the filtering capability and may cause excessive pressure drop.

U.S. Pat. No. 4,714,486 to Silverthorn, discloses a filter canister having a canister body with top and bottom parts sealed together, a filter for particulate material sealed into the top part and a separate sorbent cartridge fitted into the bottom part of the body. The design of the prior air filter cannister does not allow for uniform air distribution throughout the plenum chamber between the first and second filters which is an undesirable attribute of the design.

Therefore, as can be seen from the prior art patents, there is a need for a novel filter cartridge assembly which can be used with one or more filter assemblies and thus provide for structure bed integrity and for uniform distribution of air throughout the assembly.

SUMMARY OF THE INVENTION

The present invention meets the above-described need by providing a housing that combines with a particulate filter having an irregular shaped gas sorbent bed. Proper usage of the filter cartridge requires that the air passing through the filter be distributed uniformly over the sorbent bed. Thus, the filter cartridge directs the air radially over the surface of the sorbent bed utilizing the vane-like structures radiating out from the reticulated members. A multi-functional assembly located within the filter housing has been named a replendam. The term "replendam" is an acronym for an assembly which is a retention screen, a plenum chamber, and an adhesive barrier for a particulate filter.

As a retention screen, it provides stability to the sorbent bed to ensure individual grains of sorbent do not move or otherwise shift in the sorbent column. Errant settling or shifting of the sorbent changes the flow characteristics of the bed and effects essential residence time of the gases that the bed must absorb.

As a plenum chamber, it ensures that the face velocity across the sorbent bed is uniform.

As an adhesive barrier, it prevents migration of glue into the plenum when the particulate filter is potted in place. Since the immobilization screen must apply pressure evenly, the adhesive barrier must be designed to allow a cushion so the filter area under it is not crushed.

The foregoing and additional advantages and characterizing features of the present invention will become clearly apparent upon reading of the following detailed description together with the included drawings.

BRIEF DESCRIPTION OF THE DRAWINGS

FIG. 1 is a perspective view of the combination filter/cartridge assembly of the present invention.

FIG. 2 is a side elevational view of the combination filter/cartridge assembly of FIG. 1.

FIG. 5 is a detailed partial view of the combination filter/cartridge assembly shown in FIG. 3.

DETAILED DESCRIPTION

Figure 3:
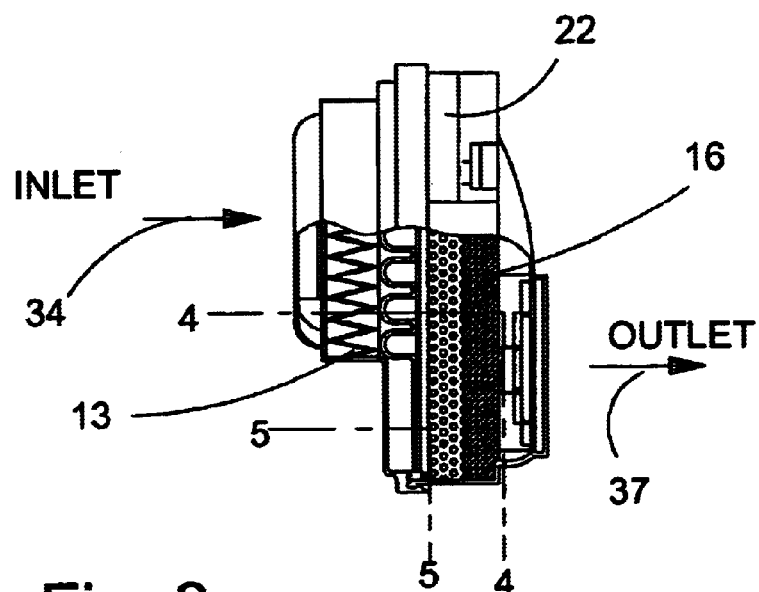
FIG. 3 is a partially cutaway side elevational view of the combination filter/cartridge assembly.

Now, referring to FIGS. 1–23 generally and initially to FIG. 1, a combination cartridge/filter assembly 10 of the present invention is shown. The assembly 10 includes a particulate filter media 13 (FIG. 4) and a sorbent bed 16 (FIG. 4). The sorbent bed 16 is formed out of a sorbent media 17 that may include carbon materials comprising impregnated carbon and/or activated carbon. Other granular sorbent materials may also be suitable. Also, any materials that are air permeable and that are capable of absorbing or reacting with the gas contaminants to be removed or neutralized would also be suitable. The filter media 13 and the sorbent bed 16 are disposed in a series arrangement with a relatively small plenum chamber disposed between the filter media 13 and the sorbent bed 16 as will be described herein. The assembly 10 comprises a cover 19 that snaps onto a body 22. The cover 19 includes a grill or reticulated wall 23 spanning an opening 24. The filter media 13 fits inside the cover 19 and is separated from the sorbent bed 16 by a replendam 25 (FIGS. 4 and 6–10) as described below. The cover 19, body 22, and replendam 25 are formed out of suitable thermoplastic materials in injection molding processes or the like. Other materials having suitable properties for use as a filter cartridge and replendam may also be used.

In FIG. 2, the cover 19 has an air inlet 28 where ambient air is drawn into the assembly 10 for purification. The assembly 10 is suitable for use with a respiratory mask of the type disclosed in U.S. Pat. No. 6,016,804 which is assigned to the assignee of the present invention and which is incorporated herein by reference. The outlet 31 of assembly 10 attaches to the inlet of a respiratory mask.

Figure 4:
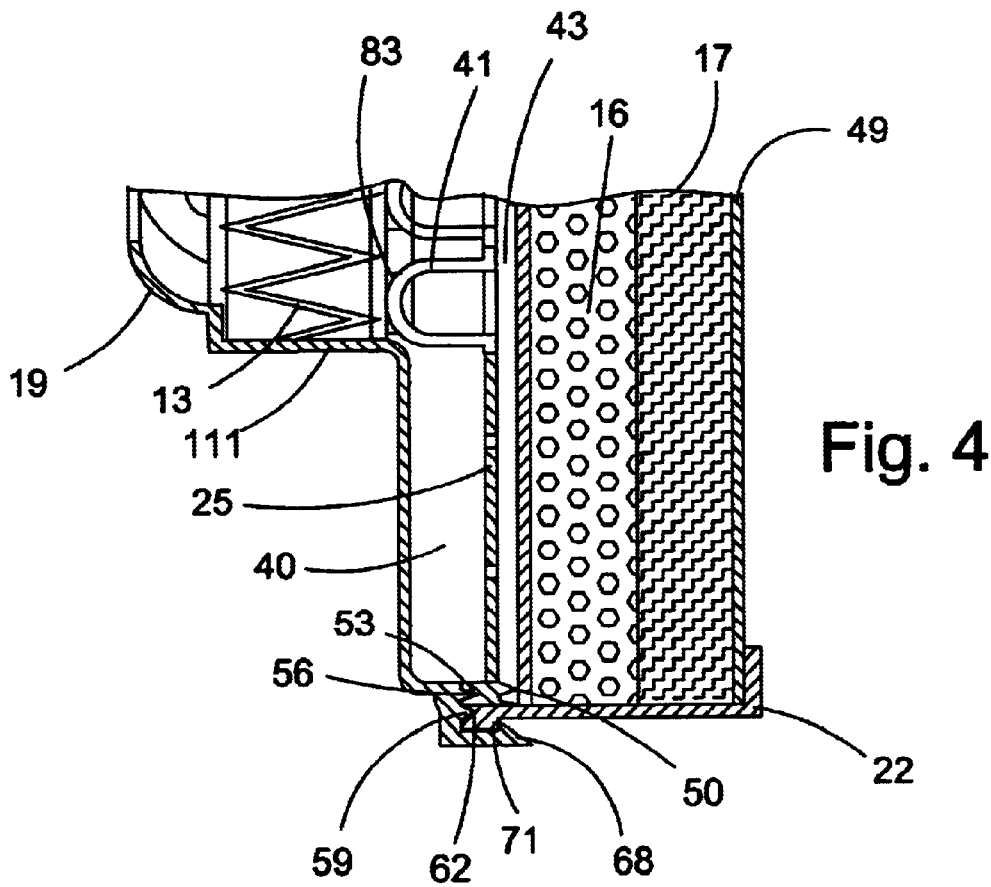
FIG. 4 is a detailed partial view of the combination filter/cartridge assembly shown in FIG. 3.
Figure 6:
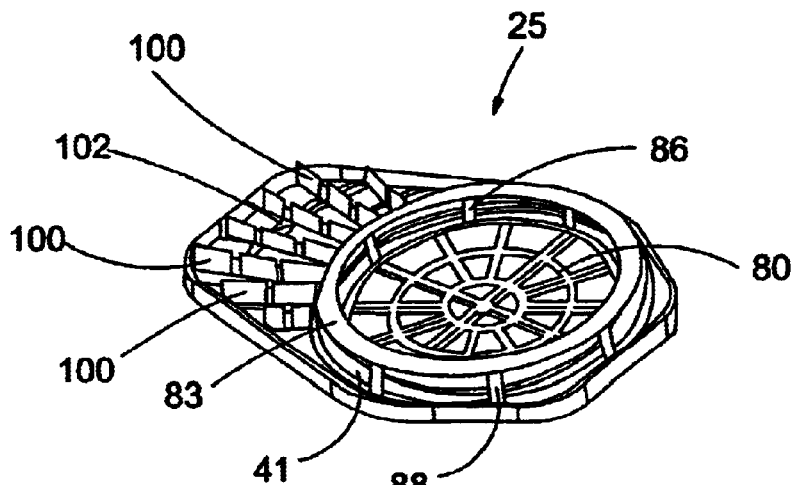
FIG. 6 is a perspective view of the replendam.
Figure 8:
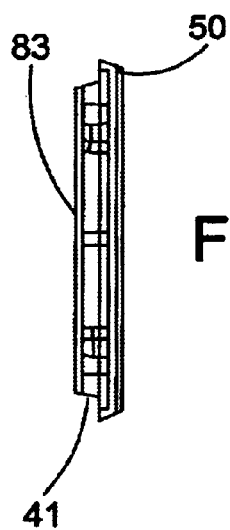
FIG. 8 is a cross-sectional view taken along line 8—8 of FIG. 7.

Turning now to FIG. 3, the path for the flow of air is indicated by arrows 34 and 37. The particulate filter media 13 is a round pleated filter media. Other particulate filters may also be suitable and other shapes of filters may also be suitable. The body 22 for the sorbent bed 16 is significantly larger than the filter media 13 and has an irregular six-sided shape. However, the number of sides and the shape of the sorbent bed 16 is not critical.

In FIG. 4, the cover 19 houses the particulate filter media 13 which as described above is typically a round pleated filter media. The pleated filter media 13 is potted in the cover 19 as will be described in detail hereinafter. The inside of the cover 19 in cooperation with the bottom surface of the media 13, the replendam 25, and the top of the sorbent bed 16 forms a plenum chamber 40 between the filter media 13 and the sorbent bed 16 which is located in body 22. The replendam 25 maintains separation between the filter media 13 and the sorbent bed 16 to form plenum chamber 40. Also, the replendam 25 applies pressure to immobilize the sorbent bed 16 when the cover 19 is snapped onto the body 22 as will be described in detail hereinafter. In part, the immobilizing pressure is applied through a plurality of plastic springs 41 which will be described in detail hereinafter. The replendam 25 engages with a retention filter media 43 disposed over the sorbent media 17. The last layer inside the body 22 is a second retention filter media 49, which is preferably a fines filter that may be placed in the bottom of the body 22 or attached to the bottom of the body 22 by sonic welding, glueing, or other process.

As shown in FIG. 4, the perimeter of the replendam 25 has a V-shaped rib 50 extending downward toward the sorbent bed. Above the V-shaped rib 50, the replendam 25 has a V-shaped groove 53 disposed therein. A corresponding V-shaped rib 56 disposed on the cover 19 engages with the groove 53 when the cover 19 is snapped onto the body 22. The cover 19 has a second V-shaped rib 59 that engages with a V-shaped groove 62 disposed in the upper edge of the side wall 65 of the body 22. The cover 19 also includes a hook portion 68 (best shown in FIGS. 5 and 16) that snaps over a shoulder 71 (best shown in FIG. 19) formed in the outside top of the side wall 65 of the body 22.

Turning to FIG. 5, a sealing compound 74 is applied in a bead to the area around the V-shaped rib 59 to seal the joint where the rib 59 engages with the groove 62 (FIG. 4) in the body 22.

Figure 7:
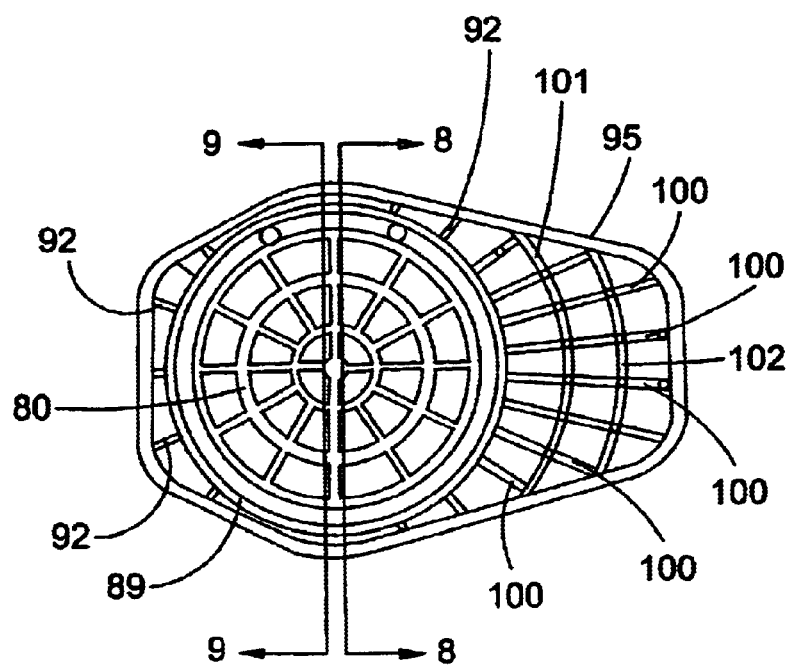
FIG. 7 is a bottom plan view of the replendam.
Figure 9:
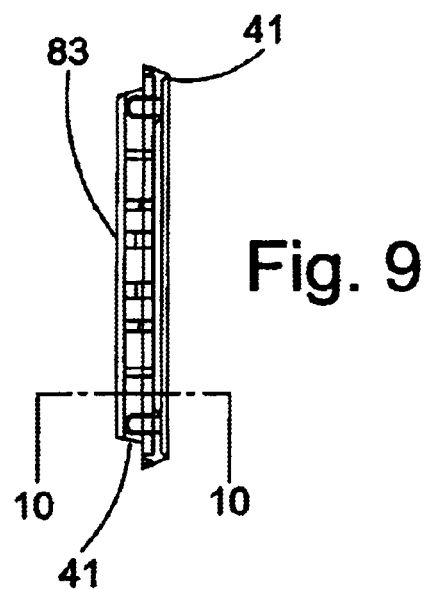
FIG. 9 is a cross-sectional view taken along line 9—9 of FIG. 7.
Figure 10:
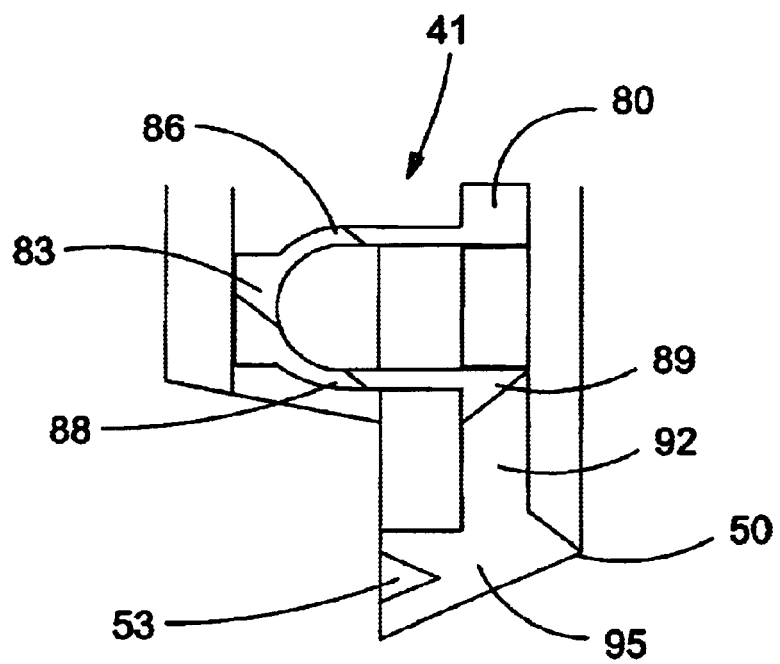
FIG. 10 is a detailed partial view from FIG. 9.
Figure 11:
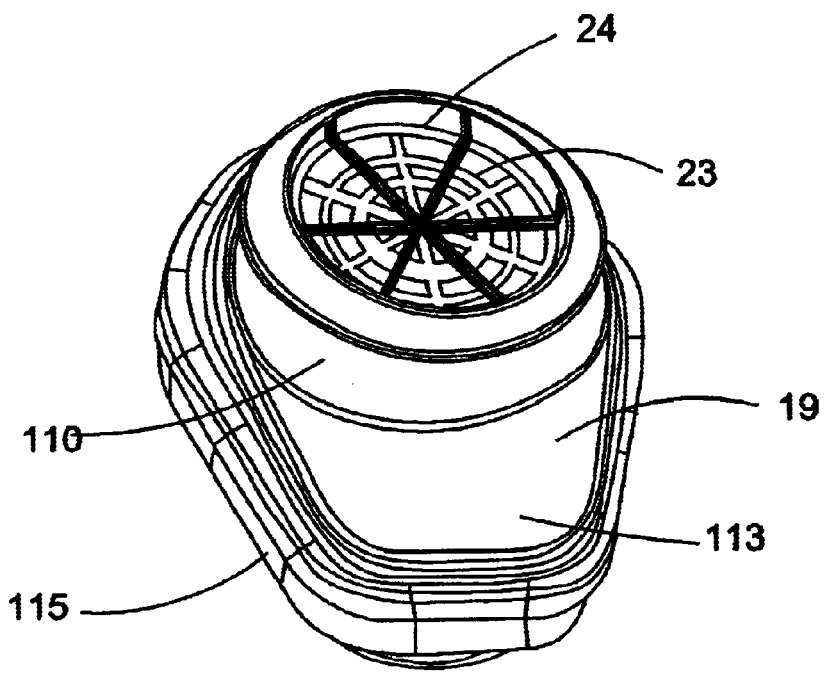
FIG. 11 is a perspective view of the cover.

In FIGS. 6–10, the replendam 25 includes a grill or reticulated wall 80 that is round to correspond to the shape of the filter media 13. Other shapes for different shaped filter media would also be suitable. An air dam 83 is disposed in substantially parallel and spaced apart relation above the reticulated wall 80. The air dam 83 is also round to correspond to the shape of the filter media 13, however, other shapes for non-round media would also be suitable. The air dam 83 acts as a adhesive barrier when the filter media 13 is potted in the cover 19 as described herein. Air dam 83 is attached to the reticulated wall 80 by a plurality of first inner legs 86 of the plurality of springs 41 (best shown in FIG. 10). In the embodiment shown, there are eight springs 41 that are approximately equidistant around the circumference of the reticulated wall 80. The springs 41 are U-shaped with the first legs generally designated as 86 being attached to the air dam 83 and the second outer legs generally designated as 88 being attached to a circular inner support frame 89 (FIG. 7). The circular or round inner support frame 89 is disposed substantially coplanar with the reticulated wall 80. The inner support frame 89 is circular or round for the round filter media 13, however, it could be other shapes for non-round media. As best shown in FIG. 10, the outer frame 95 extends below the plane formed by the reticulated wall 80, the inner frame 89, and the support members 92 so that the outer frame 95 makes the initial contact with the retention filter media 43. The plurality of lateral support members 92 attach the inner support frame 89 to an outer frame 95 forming a second reticulated wall 93 that conforms to the six-sided shape of the body 22. A plurality of vane-like members generally designated as 100 extend from the center of the reticulated wall 80 and connect between the inner support frame 89 and the outer frame 95. As shown the vane-like members 100 extend radially in substantially straight lines. For non-round filter media, the vane-like members 100 may be straight or curved depending on the filter geometry and may or may not extend radially. The vane-like members 100 extend vertically above the support members 92 between the horizontal planes defined by the reticulated wall 80 and the air dam 83. The vane-like members 100 are connected by a pair of curved members 101, 102 that are concentric with the inner frame member 89. The vanes 100 direct the air flow and also function as stiffening ribs for applications where sorbent bed immobilization is required so that energy can be transferred through the springs 41 across the replendam 25.

In FIG. 10, the V-shaped rib 50 and the V-shaped groove 53 of the replendam 25 are shown with relation to one of the springs 41 located at the side of the replendam 25. The first leg 86 of the spring 41 extends to the reticulated wall 80 and the second leg 88 extends to the inner support frame 89. A short lateral support member 92 connects the inner support frame 89 to the outer frame 95. As described above the outer frame 95 conforms to the six-sided shape of the sorbent bed 16. The outer frame 95 is formed with the V-shaped rib 50 on the bottom and with the V-shaped groove 53 on the top.

Figure 12:
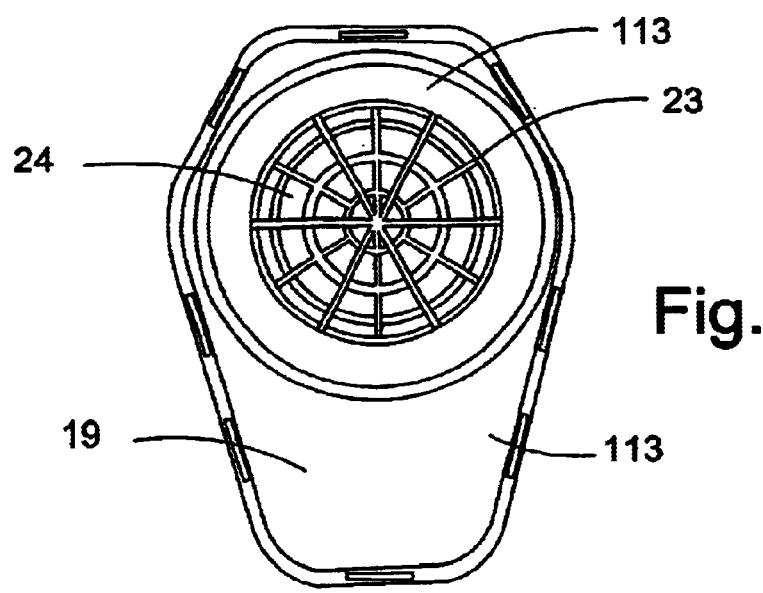
FIG. 12 is a top plan view of the cover.
Figure 13:
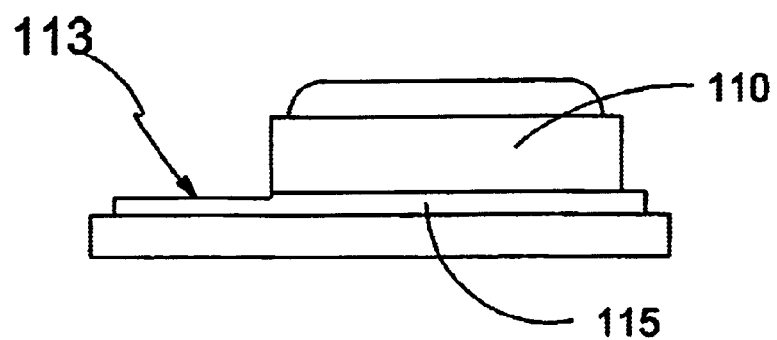
FIG. 13 is a side elevation view of the cover.
Figure 14:
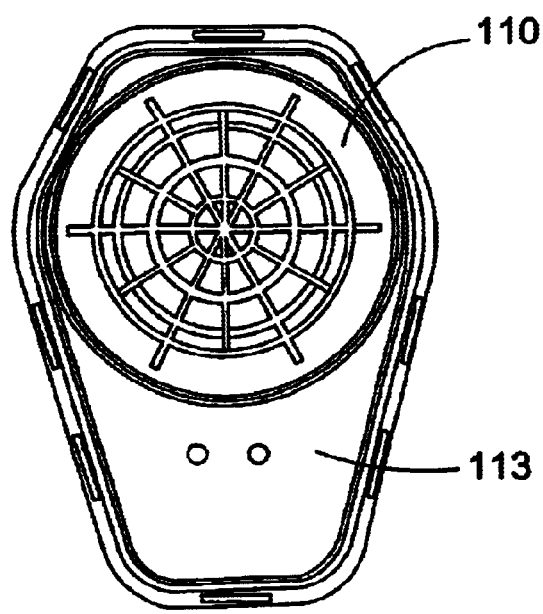
FIG. 14 is a bottom plan view of the cover.

In FIGS. 11–16, the cover 19 is shown in greater detail. The cover 19 has a complex shape with a round section 110 extending outward from a six-sided planar section 113. The round section 110 corresponds to the shape of round filter media 13. Other shapes for section 110 for use with non-round filters would also be suitable. The six-sided planar section 113 terminates in side walls 115 that extend substantially perpendicular to the planar section 113. In FIG. 12, the opening 24 is covered by the grill or reticulated wall 23.

The round filter media 13 (FIG. 4) is potted in the round section 110 by applying a glue 111 (best shown in FIG. 4) to the perimeter of the filter media 13 such that a r is prevented from passing around the edges of the filter media 13 between the media 13 and the inner wall of the cover 19. As shown in FIG. 4, the air dam 83 acts as a adhesive barrier to prevent glue from entering the plenum chamber 40.

Figure 16:
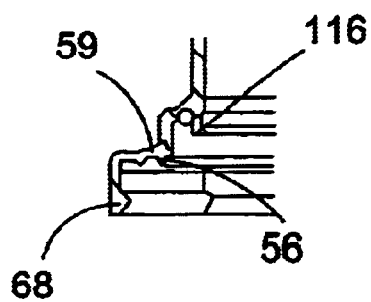
FIG. 16 is a detailed partial sectional view of the cover.
Figure 15:
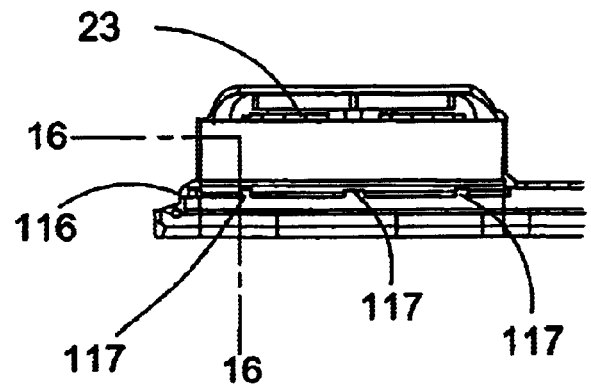
FIG. 15 is a sectional side elevational view of the cover.
Figure 17:
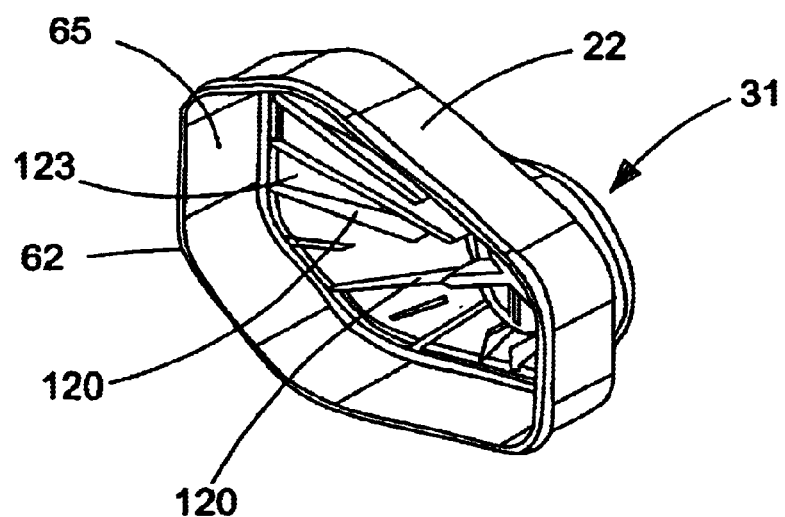
FIG. 17 is a perspective view of the body.

In FIG. 16, the hook 68 and the first and second V-shaped ribs 56, 59 are shown in greater detail. Also shown is an inner wall 116 that extends downward for a short distance and surrounds the round section 110 for the round filter media 13. As shown in FIG. 15, the wall 116 has openings generally designated as 117 defined therein that are sized to receive the springs 41 that extend toward the air dam 83 when the replendam 25 is installed in the cartridge assembly 10. When the replendam 25 is installed in the assembly 10, the air dam 83 fits inside the inner wall 116, and the V-shaped groove 53 in the replendam 25 engages with the first rib 56 (best shown in FIG. 4).

FIGS. 17–20, illustrate the body 22 in greater detail. The body 22 has a set of ribs generally designated as 120 disposed on a bottom surface 123. The ribs 120 are designed to channel the air flow toward the outlet and to assist in the immobilization of the sorbent materials 46. The bottom surface 123 is substantially planar and is shaped in a six-sided shape. Other shapes may also be suitable. The bottom surface 123 is bordered by a plurality of side walls 65 that extend substantially perpendicular to the bottom surface 123 to form a chamber.

Figure 18:
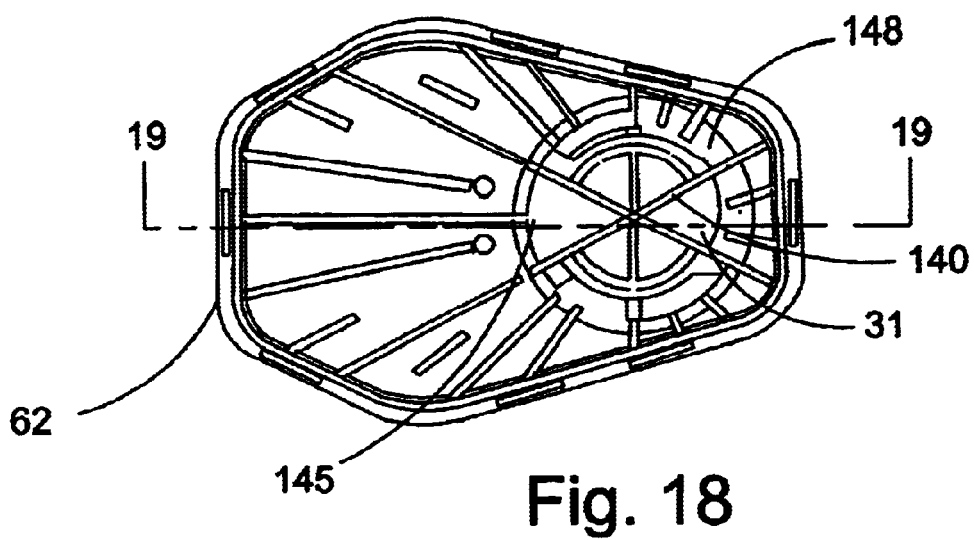
FIG. 18 is a top plan view of the body.
Figure 19:
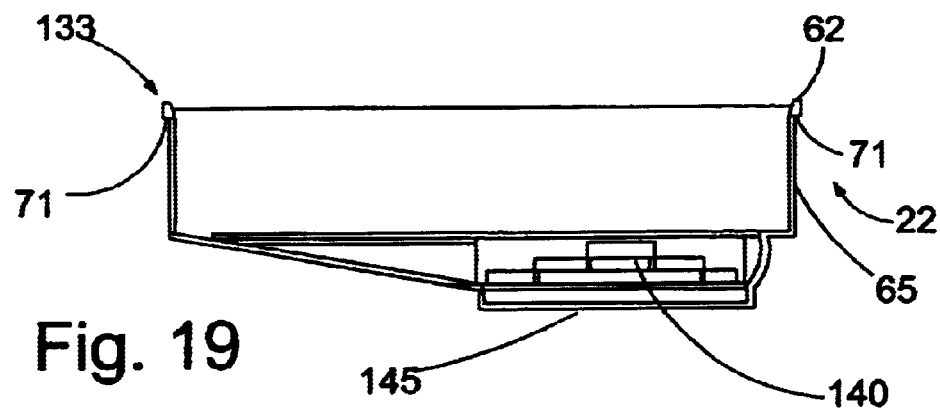
FIG. 19 is a sectional side elevational view of the body.

In FIG. 18, the outlet 31 has a grill or reticulated wall 140 that supports the sorbent bed 16. Turning now to FIG. 19, the body 22 has an opening 145 that is disposed in spaced apart relation to the reticulated wall 140. The opening 145 has a pair of truncated sides 148 that provide for inserting a quarter-turn bayonet mount adapter such as disclosed in U.S. Pat. No. 6,016,804 through the opening. The space between the opening 145 and the reticulated wall 140 provides clearance for the adapter on the respiratory mask to fit inside the cartridge assembly 10 and to turn into a locked position.

As shown in FIG. 19, the side walls 65 have shoulder 71 extending around the periphery of the top edge 133 of the side walls 65. As described above, the shoulder 71 cooperates with the hook 68 on the cover to provide for a snap-fit.

Figure 20:
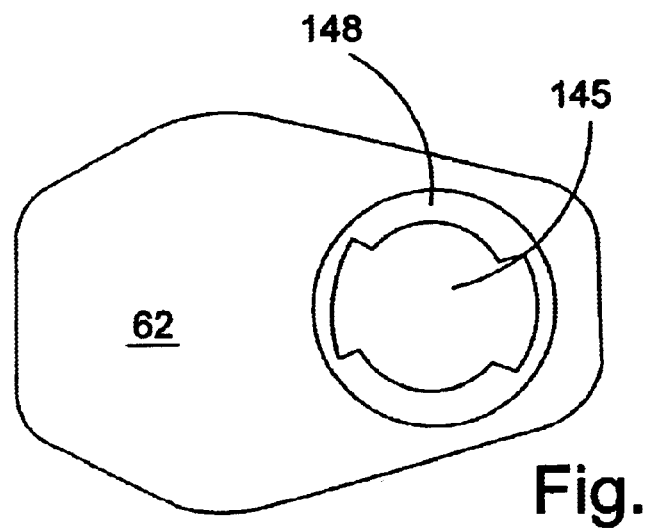
FIG. 20 is a bottom plan view of the body with the reticulated wall removed for clarity.
Figure 21:
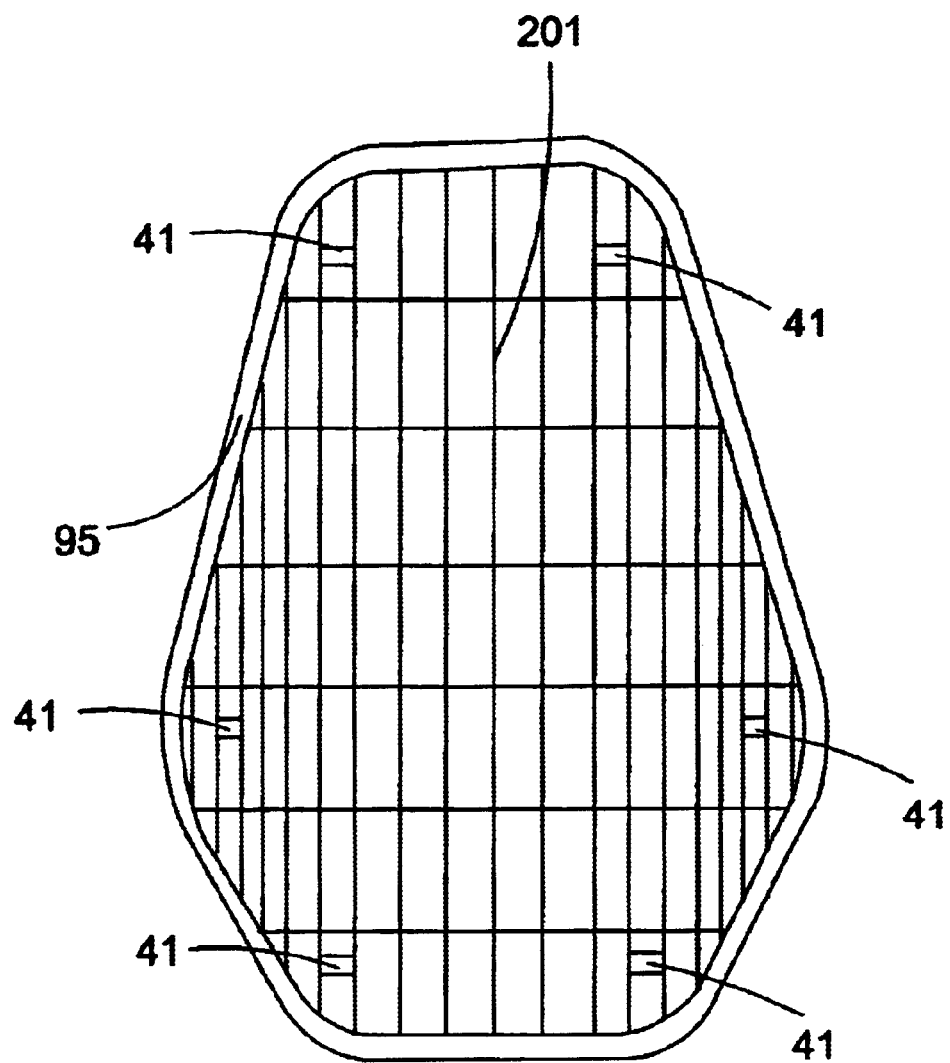
FIG. 21 is a top plan view of an alternate embodiment of the present invention.

In FIG. 20, the opening 145 is shown with the reticulated wall 140 removed such that the sides 148 are clearly shown. The opening 145 is designed with sides 148 such that the assembly 10 is capable of mounting onto a respiratory mask by means of a quarter turn bayonet adaptor of the type disclosed in U.S. Pat. No. 6,016,804.

In operation, the combination filter/cartridge assembly 10 performs several functions. Returning to FIG. 4, the replendam 25 serves several functions. First, the replendam 25 is sized such that the bottom surface provides an immobilization force when the cover 19 is snapped onto the body 22. When the cover 19 is snapped onto the body 22, the bottom of the round filter media 13 engages with the air dam 83 to provide a downward force against the sorbent bed 16. The force is transmitted through the springs 41 to the entire bottom surface of the replendam 25 such that an immobilization force is applied throughout the bottom surface of the replendam 25 onto the top surface of the sorbent bed 16. Also, the rib 50 disposed around the perimeter of the replendam 25 is forced downward onto the retention filter 43 when the cover 19 is snapped onto the body 22. The rib 50 provides a knife edge engagement with the retention filter media 43 that holds the media 43 in position.

Accordingly, the force of the replendam 25 on the top of the sorbent bed 16 promotes sorbent pack density and stability. As known to those of ordinary skill in the art, the settling or shifting of sorbent changes the flow characteristics of the bed and effects residence time of the gases that the bed must absorb.

In addition to transmitting force to the bottom surface of the replendam 25 through the springs 41, the air dam 83 also provides a adhesive barrier to prevent the glue that is used to pot the filter media 13 in the cover 19 from entering the plenum chamber 40.

Returning to FIG. 7, the design of the replendam 25 also promotes uniform distribution of air over the sorbent bed 16. The plenum 40 is designed to provide a chamber where equalization of the air flow can occur prior to entry of the air into the sorbent bed 16 such that the sorbent bed 16 surface uniformly receives air having the same or approximately the same face velocity. Uneven distribution of airflow will underutilize the sorbent bed 16 and decrease the bed life. Also, the radial vane-like structures 100 of the replendam 25 direct the air flow in the plenum chamber 40 over the entire surface of the sorbent bed 16 to promote uniform distribution of air flow across the bed.

The embodiment shown in FIGS. 1–20 provides a replendam 25 for use between filter media 13 and sorbent bed 16. However, the replendam 25 of the present invention could also be disposed between two different sized filter media or a multi-stage cartridge could be constructed with more than one replendam 25 disposed in combination with filter media and/or sorbent beds.

Also, the springs 41 may be utilized in a single stage filtering system such that the device would not include the vanes 100 and the plenum chamber 40. For example in an alternate embodiment shown in FIG. 21, the springs 41 could engage with an alternate cover 200 (FIG. 23) such that the springs 41 could be used to transmit a force from the cover 200 to the retention filter 43 through the outer frame 95 and the reticulated structure 201 above the so-bent bed 16. The cover 200 has an irregular-shaped opening. As an alternative, the cover 200 could be provided with a round, smaller opening such as the opening covered by a reticulated wall shown in FIG. 11. Accordingly, the smaller round opening would facilitate an easy negative pressure check by the user of the device who would be able to cover the opening with one hand.

In certain applications the force on the sorbent bed transmitted through the springs 41 to the replendam 25 may not be required. These applications may include situations where the replendam 25 is disposed between two filters or if the sorbent does not require the force on the top of the bed.

Figure 22:
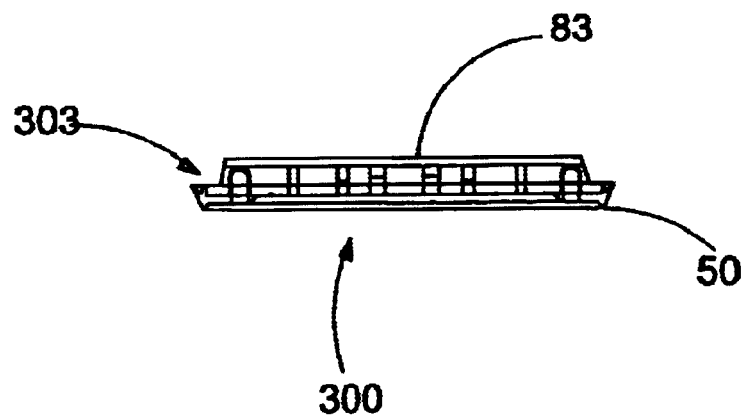
FIG. 22 is a side elevational view of an alternate embodiment of the replendam of the present invention.
Figure 23:
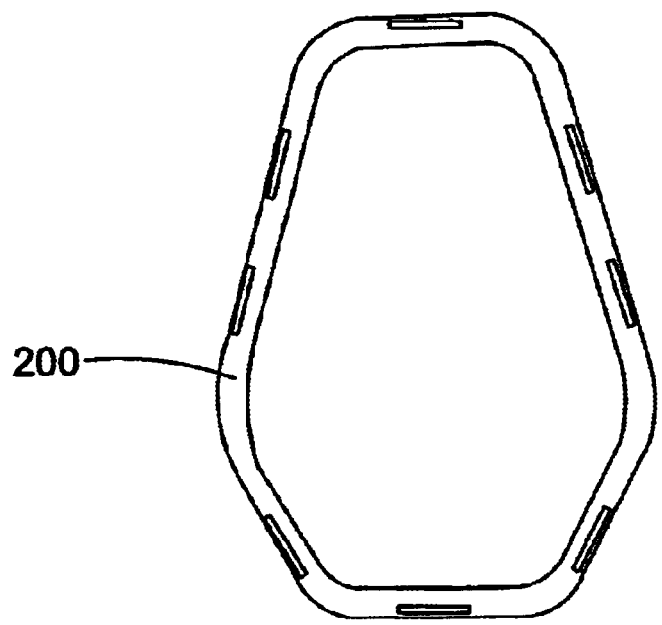
FIG. 23 is an alternate embodiment of the cover of the present invention.

Also, in another alternate embodiment for forming a plenum, an alternate replendam 300 shown in FIG. 22 could be constructed without plastic springs generally designated as 41. The replendam 300 could have the adhesive barrier air dam 83 connected to the inner support member 92 by means of a solid member 303 without spring properties. Accordingly, the springs 41 and the design of the replendam 25 may or may not be used in combination depending on the application.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention.

What is claimed:

1. A replendam, comprising:
   a first reticulated wall having a perimeter;
   a second reticulated wall disposed about at least a portion of the perimeter of the first reticulated wall, the second reticulated wall having a plurality of vanes supported thereon, the second reticulated wall extending to an outer frame; and,
   an air dam disposed in spaced apart relation to the first reticulated wall, wherein the air dam is attached to the replendam by a spring.

2. The replendam of claim 1, wherein the air dam is attached to the first reticulated wall and to the second reticulated wall.

3. A replendam, comprising:
   a first reticulated wall having a perimeter;
   a second reticulated wall disposed about at least a portion of the perimeter of the first reticulated wall, the second reticulated wall having a plurality of vanes supported thereon, the second reticulated wall extending to an outer frame; and,
   an air dam disposed in spaced apart relation to the first reticulated wall; wherein the air dam is attached to the first and second reticulated walls by a spring having a first leg attached to the first reticulated wall and having a second leg attached to the second reticulated wall.

4. The replendam of claim 3, wherein the first reticulated wall is round.

5. The replendam of claim 4, wherein the plurality of vanes extend from the perimeter of the first reticulated wall.

6. The replendam of claim 3, wherein the outer frame has a groove disposed on a first side.

7. The replendam of claim 6, wherein the groove is V-shaped.

8. The replendam of claim 3, wherein the outer frame has a sealing edge disposed on the side opposite from the air dam.

9. A replendam, comprising:
   a first reticulated wall having a perimeter;
   a second reticulated wall disposed about at least a portion of the perimeter of the first reticulated wall, the second reticulated wall having a plurality of vanes supported thereon, the plurality of vanes extending from the perimeter of the first reticulated wall, the second reticulated wall extending to an outer frame, the outer frame having a sealing edge disposed thereon; and,
   an air dam disposed in spaced apart relation to the first reticulated wall and connected to the first and second reticulated walls, wherein the air dam is attached to the replendam by a spring.

10. A replendam, comprising:
    a first reticulated wall having a perimeter;
    a second reticulated wall disposed about at least a portion of the perimeter of the first reticulated wall, the second reticulated wall having a plurality of vanes supported thereon, the plurality of vanes extending from the perimeter of the first reticulated wall, the second reticulated wall extending to an outer frame, the outer frame having a sealing edge disposed thereon; and,
    an air dam disposed in spaced apart relation to the first reticulated wall and connected to the first and second reticulated walls; wherein the air dam is connected to the first and second reticulated walls by a spring having a first leg attached to the first reticulated wall and having a second leg attached to the second reticulated wall.

11. The replendam of claim 10, wherein the first reticulated wall is round.

12. The replendam of claim 10, wherein the outer frame has a groove disposed on a first side.

* * * * *